June 28, 1932. G. F. WALTER 1,864,566
MULTIPLE RECORDING UNIT
Filed May 23, 1929 2 Sheets-Sheet 1

INVENTOR
GEORGE F. WALTER
BY
ATTORNEY

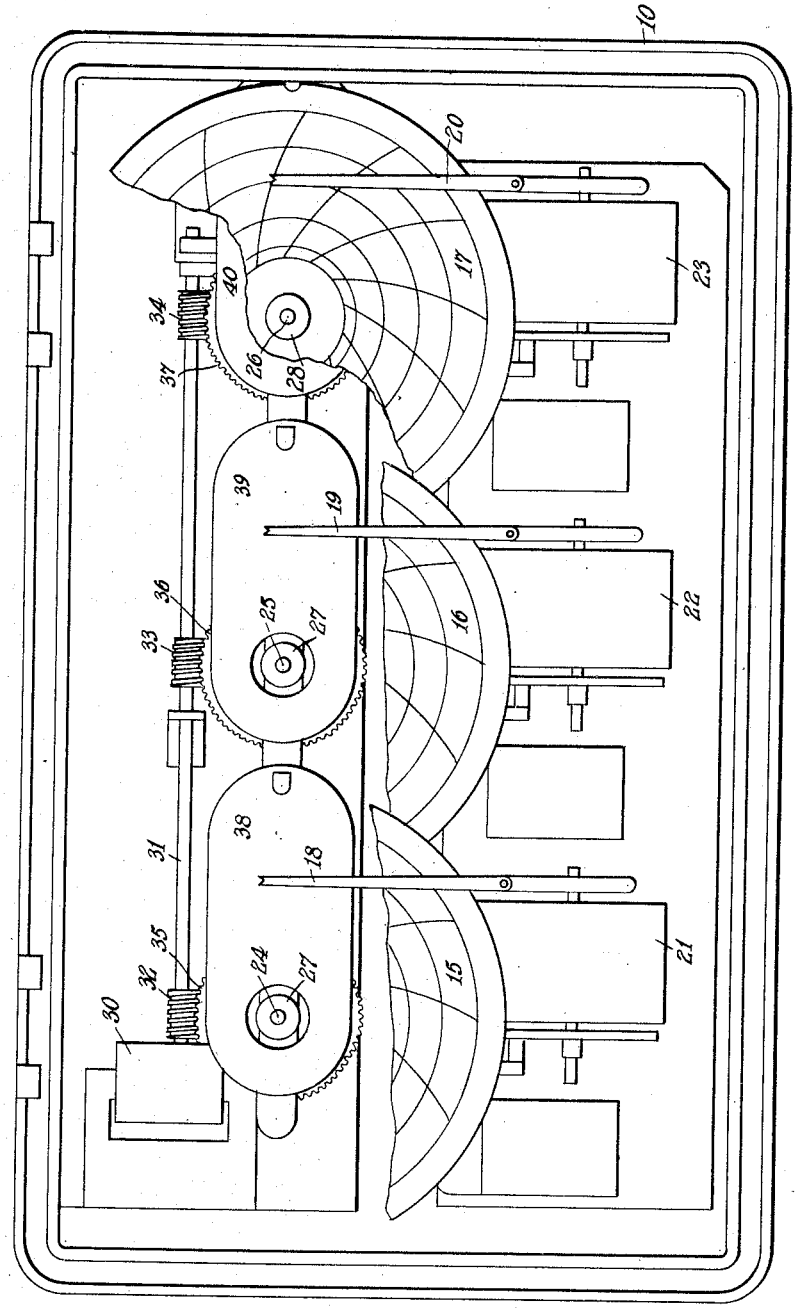

Patented June 28, 1932

1,864,566

UNITED STATES PATENT OFFICE

GEORGE F. WALTER, OF MAPLEWOOD, NEW JERSEY

MULTIPLE RECORDING UNIT

Application filed May 23, 1929. Serial No. 365,349.

The invention relates to measuring apparatus, more especially to a recording instrument in which a plurality of records are simultaneously effected upon respective movable chart elements.

It has for its object a recording apparatus of this character wherein all of the various charts are driven in synchronism from a single motor device; and wherein, furthermore, the arrangement is such that a minimum of space is occupied by the recording members and charts over which they operate, so that a compact multiple recording unit is attained.

To this end, the chart elements upon which the record is effected, such as the usual flexible circular paper charts generally employed in recording apparatus, are arranged to be rotated continuously by respective arbors which are simultaneously driven from a common motor device; and the said charts are, furthermore, arranged to overlap one another in manner such that, while all are continuously rotating, a portion of the non-recording or temporarily inactive portion of one chart is covered by the active or recording portion of an adjacent chart, thereby conserving space and affording a compact instrument which may be enclosed in a suitable protective casing having a cover member provided with a suitably-shaped window or aperture over the active record portions and sealed by a piece of transparent glass through which the records effected on the respective charts may be read.

The nature of the invention, however, will best be understood when described in connection with the accompanying drawings, in which:

Fig. 2 is a similar view with the cover member removed and chart portions broken away.

Figure 1:
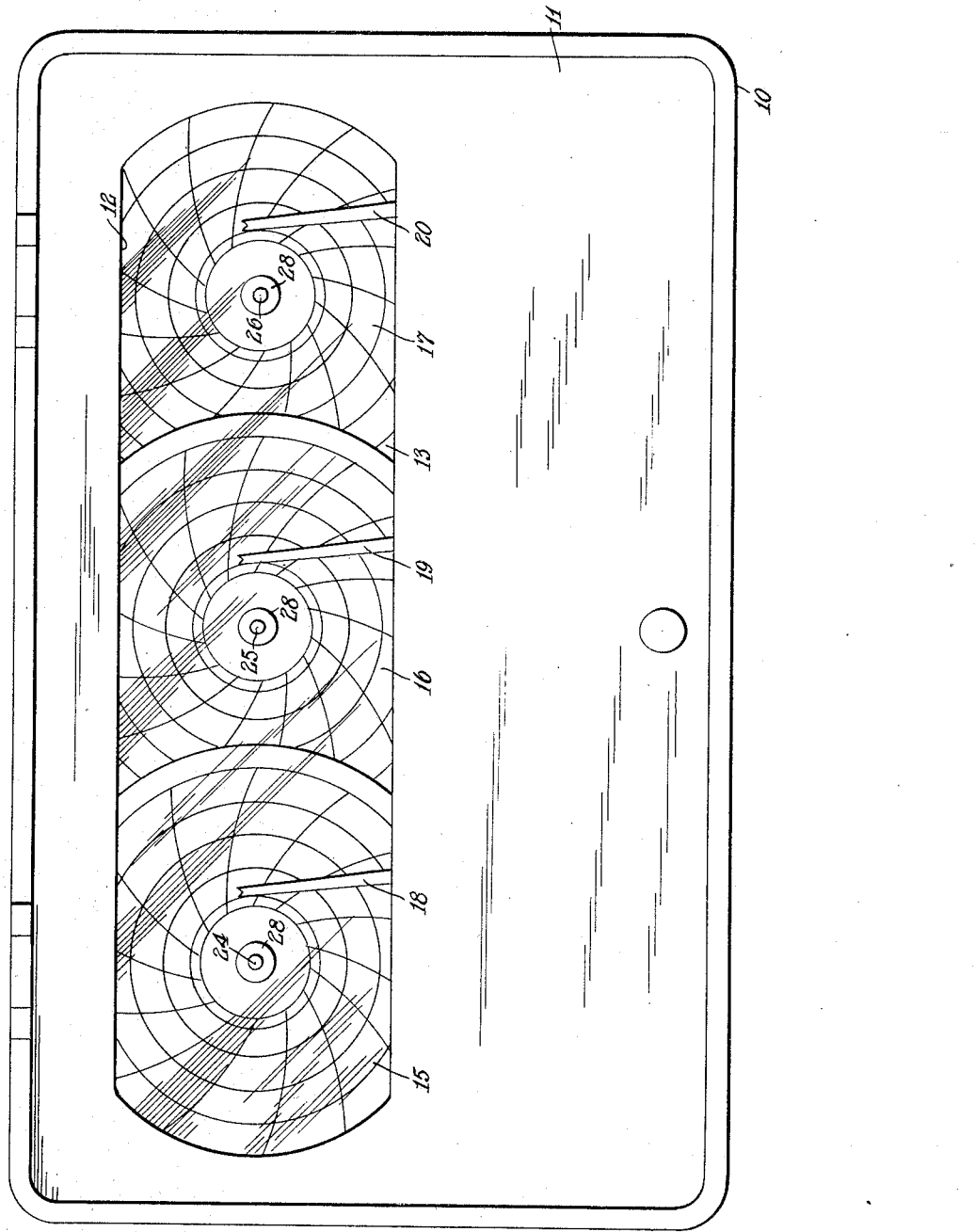
Fig. 1 is a front elevation of the novel recording unit.

Referring to the drawings, 10 designates a suitable container or protective casing wherein the entire mechanism is to be encased, said casing having the lid 11 hinged thereto and provided with a suitably-shaped aperture as the elongated aperture 12 which is sealed with a piece of transparent glass 13. Through the latter, a plurality of the recording charts 15, 16 and 17 are visible, or at least the active portions thereof outlined by said aperture, and over which charts are adapted to travel recording arms or pen members 18, 19 and 20, respectively. These recording members are actuated in well-known manner from corresponding mechanisms indicated at 21, 22 and 23 and controlled by temperature, pressure, electricity, motion, etc., in the usual manner, the pen following the same and its position relative to a chart determining the markings or record thereon as is well understood.

The said charts are of the circular type and are arranged to be rotated continuously by corresponding arbors 24, 25 and 26, a chart being seated on a flange 27 of an arbor and secured thereon by means of a hub cap 28 in the usual manner, so as to partake of the rotational movement of an arbor. Motion to all of the arbors is imparted simultaneously thereto and in synchronism from a common drive member as the motor 30 which may be spring or electrically actuated.

For example, the said motor 30 drives a worm shaft 31 having thereon a plurality of worms 32, 33 and 34 which engage worm wheels 35, 36 and 37, respectively, of the arbors 24, 25 and 26. This also makes for compactness and simplicity of the instrument in that but a single drive member is required and provides, moreover, for the driving of all of the charts in synchronism.

The said charts, moreover, are so arranged and positioned that a further and very appreciable saving in space is attained and the ultimate size of the instrument may be reduced to minimum proportions. To this end, the respective arbors 24, 25 and 26 are so spaced longitudinally of the instrument that the respective charts carried thereby while lying substantially in a common plane yet have their rotational planes displaced slightly in the axis of an arbor so that successive charts may overlap one another. For example, the intermediate chart 16 has its active portion over which the recording member 19 operates overhang the temporarily inactive portion of the adjacent chart 17, while said chart 16 in turn has its temporarily inactive portion covered in part by the active portion of the other adjacent chart 15. Tables or supporting strips 38, 39 and 40 may be provided beneath the active recording portions of the charts in the usual manner; but it will be appreciated that the thickness of these supports as well as of the charts themselves is not such as to appreciably increase the dimensions of the instrument in the direction of the axes of the arbors 24, 25 and 26.

The foregoing arrangements, therefore, secure a very compact and efficient recording instrument whereby a multiplicity of records may be provided without unduly increasing the size of the apparatus, which is very essential under present-day power station practice. Also, all of the various charts are readily accessible merely by raising the cover 11, as for replacement of the said charts.

I claim:

In a recording apparatus, a plurality of rotatable chart-supporting members, circular charts supported thereon for rotation therewith, recording members associated with the respective charts for effecting a record thereon, said recording members all operating over substantially similar portions of the different charts, and means common to the various chart-supporting members for effecting synchronous and continuous rotation thereof, the said supporting members for the charts being so located relatively to each other that the charts are supported thereon in manner such that a temporarily active portion of one chart overhangs a temporarily inactive portion of another.

In testimony whereof I affix my signature.

GEORGE F. WALTER.